United States Patent
Howard, II et al.

(10) Patent No.: US 10,959,375 B1
(45) Date of Patent: Mar. 30, 2021

(54) REFUSE CATCHER BAG FOR A GROUND TENDING MACHINE

(71) Applicants: Richard Lee Howard, II, Brighton, MI (US); Chase Richard Howard, Brighton, MI (US)

(72) Inventors: Richard Lee Howard, II, Brighton, MI (US); Chase Richard Howard, Brighton, MI (US)

(*) Notice: Subject to any disclaimer, the term of this patent is extended or adjusted under 35 U.S.C. 154(b) by 134 days.

(21) Appl. No.: 16/136,303

(22) Filed: Sep. 20, 2018

Related U.S. Application Data (60) Provisional application No. 62/562,529, filed on Sep. 25, 2017.

(51) Int. Cl.
*A01D 43/063* (2006.01)
*A01D 101/00* (2006.01)

(52) U.S. Cl.
CPC ...... *A01D 43/0636* (2013.01); *A01D 2101/00* (2013.01)

(58) Field of Classification Search
CPC .............. A01D 43/063; A01D 43/0636; A01D 43/0638; A01D 2101/00
USPC .......................................................... 56/202
See application file for complete search history.

(56) References Cited

U.S. PATENT DOCUMENTS

| | | | | |
|---|---|---|---|---|
| 3,492,800 A | * | 2/1970 | Peterson | A01D 43/063 56/202 |
| 3,995,414 A | * | 12/1976 | Kerr | A01D 43/063 56/202 |
| 4,345,418 A | * | 8/1982 | Arizpe | A01D 43/063 56/10.5 |
| 4,377,063 A | * | 3/1983 | Leaphart | A01D 43/0636 56/202 |
| 4,413,467 A | * | 11/1983 | Arizpe | A01D 43/063 56/10.5 |
| 4,989,400 A | * | 2/1991 | Wark | A01D 43/063 383/42 |
| 5,003,758 A | * | 4/1991 | Bernstein | A01D 43/063 15/349 |
| 5,179,824 A | * | 1/1993 | Ridge | A01D 43/063 56/202 |
| 5,243,809 A | * | 9/1993 | Redding | A01D 43/063 55/364 |
| 5,564,265 A | * | 10/1996 | Pitt | A01D 43/063 56/202 |

(Continued)

FOREIGN PATENT DOCUMENTS

CA 2371639 A1 * 8/2003 ........... A01D 43/063

OTHER PUBLICATIONS

RepairClinic.com, Toro Lawn Mower Grass Bag Replacement #115-4673, Jun. 8, 2011, available at https://www.youtube.com/watch?v=BCGHYnbi-Xw (Year: 2011).*

*Primary Examiner* — Michael McCullough (57) ABSTRACT

A catcher bag for ground tending machine such as a power lawn mower. The catcher bag is constructed of biodegradable perforated paper and replaces an O.E.M. fabric catcher bag. The disclosed catcher bag can mount on a variety of O.E.M. catcher bag frames of O.E.M. rear discharge lawn mowers, and greatly eases the effort of collecting and disposing of lawn clippings and leaf debris by eliminating labor-intensive, cumbersome, and often messy/dusty steps in transferring debris from a fabric catcher bag into a standard paper lawn refuse disposal bag.

3 Claims, 6 Drawing Sheets

(56) References Cited

U.S. PATENT DOCUMENTS

| | | | | |
|---|---|---|---|---|
| 6,151,875 | A | 11/2000 | Collins | |
| 6,810,651 | B1 | 11/2004 | Washington | |
| 7,806,593 | B2 * | 10/2010 | Toporski | A01D 43/063 383/1 |
| 8,051,635 | B2 * | 11/2011 | Vineis | A01D 43/063 56/202 |
| 8,517,610 | B2 * | 8/2013 | Arcot | B65D 31/16 141/391 |
| 2005/0025397 | A1 * | 2/2005 | Zhao | B65D 33/01 383/102 |
| 2007/0071365 | A1 * | 3/2007 | Stevens | A01D 43/063 383/33 |
| 2008/0264029 | A1 * | 10/2008 | Sepaniak | A01D 43/0636 56/202 |
| 2012/0198806 | A1 * | 8/2012 | Shay | A01D 43/0636 56/202 |
| 2014/0318096 | A1 * | 10/2014 | Lukas | A01D 43/0636 56/202 |

* cited by examiner

REFUSE CATCHER BAG FOR A GROUND TENDING MACHINE

PRIORITY CLAIM

This non-provisional patent application claims priority of Provisional Patent Application No. 62/562,529, filed Sep. 25, 2017, and incorporates by reference the entire content of that prior application.

TECHNICAL FIELD

This invention relates generally to collection of refuse by a ground tending machine, such as a lawn mower for example, as the machine moves over underlying ground.

BACKGROUND

Walk-behind power lawn mowers, self-propelled and non-self-propelled, are examples of ground tending machines. Such lawn mowers have a cutting mechanism powered by either a gasoline engine or an electric motor operated by electricity from a self-contained battery or through an electrical cord plugged into an electrical receptacle. Such mowers also have a perforated fabric refuse catcher bag mounted on a frame which separably attaches to the mower. As a mower travels over ground, it cuts underlying vegetation such as grass, weeds, and fallen leaves, creating clippings and mulchings in the process, which, along with other sorts of ground debris and dirt, are then propelled through a mouth of the perforated fabric catcher bag and into the bag's interior where they are contained and collected as refuse. When the catcher bag is to be emptied of collected refuse, which is often compacted, a person removes the frame, with the bag mounted on it, from the mower, and typically empties the bag by repeatedly shaking the collected refuse out of the bag through the bag's mouth into a conventional paper lawn bag which has been stood upright on the ground and through the open top of which the refuse can enter the bag's interior. Because shaking the compacted refuse out of the perforated fabric bag is a time-consuming and work-intensive task which also generates airborne particulates, a person shaking the bag may want to wear a protective mask to guard against inhalation of such particulates. In addition, some of the refuse may not enter the upright paper lawn bag and instead fall down onto the surrounding ground. If the refuse hits a side of the bag as it is being deposited into the bag, it may even knock the bag over.

Using a ground tending machine for the primary purpose of shredding and collecting fallen leaves rather than merely cutting vegetation growing on the ground is one form of leaf collection. That being said, fallen leaves are usually collected by time-consuming and work-intensive task in which a person uses a blower and/or a rake to gather the leaves into a pile on the ground. A person must then pick up the leaves from the pile and stuff them into a conventional lawn bag, adding to the length of time and amount of work required to complete the task.

SUMMARY OF THE INVENTION

Briefly, this disclosure introduces a novel refuse catcher bag for use with a ground tending machine. The bag comprises a rear end wall and a multi-sided side wall extending lengthwise away from the end wall and cooperating with the end wall to form an enclosure.

The enclosure has an open mouth at the front of the bag lengthwise opposite the rear end wall and an interior for containing collected ground refuse which has entered the interior through the open mouth of the enclosure.

The bag mounts on a bag-supporting wire frame of a ground tending machine which moves over ground being tended. At the bag's front, each individual side of the multi-sided side wall comprises a foldable flap. The flaps collectively surround the open mouth and are folded over respective wires of a front, or first, section of the wire frame to capture each wire between a folded flap and a lengthwise adjacent individual side wall of the multi-sided side wall. A bag support is attached to the enclosure at a location spaced lengthwise rearward of the enclosure's open mouth for supporting the bag from a rear, or second, section of the wire frame.

The enclosure contains a multitude of through-openings sized to allow air to pass from the interior out of the enclosure while limiting size of collected refuse allowed to pass from the interior out of the enclosure.

The disclosed catcher bag comprises biodegradable perforated paper for replacing an O.E.M. fabric catcher bag. The disclosed catcher bag can mount on a variety of O.E.M. catcher bag frames of O.E.M. rear discharge lawn mowers. The disclosed catcher bag greatly eases the effort of collecting and disposing of lawn clippings and leaf debris by eliminating labor-intensive, cumbersome, and often messy/dusty steps in transferring debris from a fabric catcher bag into a standard paper lawn refuse disposal bag.

In the case of leaves and other similar debris, use of the disclosed paper catcher bag avoids the time-consuming work required to rake fallen leaves and then lift them up and into a standard lawn refuse disposal bag. The user of the machine simply "vacuums" material on the ground, after shredding or cutting when the machine has a shredding or cutting mechanism, into the disclosed bag, and then unmounts the bag from the frame and disposes of the bag and its contents, such as by leaving it for curbside pickup by a refuse collection service.

One aspect of this invention relates to a novel refuse collection bag intended for use on a machine which tends underlying ground over which it moves. Tending of ground includes mowing ground vegetation like grass and weeds, mulching fallen tree leaves, and removing other unwanted debris using various methods which can be grouped under the general categories of cutting and vacuuming. With the refuse collection bag mounted on the machine and the machine tending underlying ground, the machine causes ground refuse to entrain with air being propelled out of the machine, through an open mouth of the bag, and into the bag's interior where it is collected and contained as the machine moves across underlying ground.

Another aspect of this invention relates to a machine which tends underlying ground as it travels over the ground and which has a novel refuse collection bag separably mounted on it. The machine causes refuse to be propelled through an open mouth of the bag into the bag's interior where it is collected and contained as the machine moves across ground being tended.

Still another aspect of this invention relates to a method of using a novel ground refuse collection bag on a pre-existing ground tending machine.

The foregoing summary, accompanied by further detail of the disclosure, will be presented in the Detailed Description below with reference to the following drawings that are part of this disclosure.

DETAILED DESCRIPTION

Figure 1:
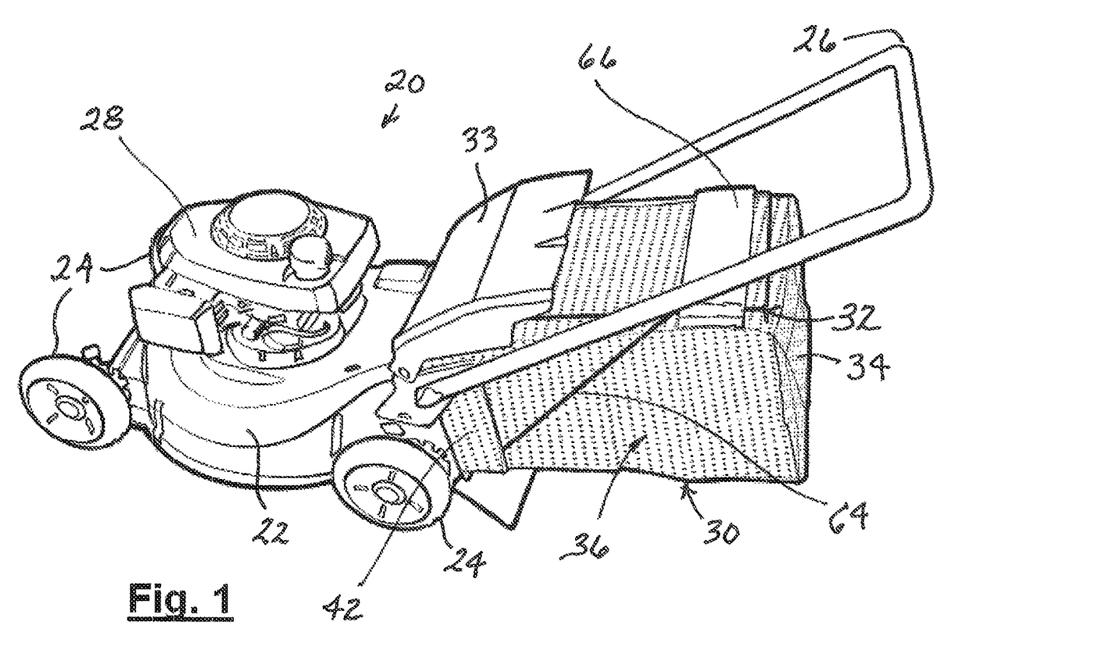
FIG. 1 is a perspective view of a representative lawn mower on which a biodegradable refuse catcher bag is mounted.

FIG. 1 shows an example of a walk-behind, single-blade type lawn mower 20 having a deck 22 which rolls on wheels 24 at four corners of the deck. A handle 26 can be grasped by a person to roll mower 20 over underlying ground. Mower 20 has a gasoline engine 28 mounted centrally on deck 22 with an output shaft (not visible in FIG. 1) extending vertically below the deck. A rotary cutting blade (also not visible in FIG. 1) is attached at the center of the blade's length to the engine's output shaft. When engine 28 operates, the blade spins at high speed about the axis of the output shaft within a surrounding cavity in deck 22 to cut grass, leaves, and other types of lawn debris into refuse. The refuse is then propelled out of the deck through a rear exit from the deck cavity (not visible in FIG. 1). A biodegradable paper refuse catcher bag 30 for collecting and containing the refuse is mounted on a removable wire frame 32 of mower 20.

Mower 20 has a spring-loaded movable door 33 which has been swung open in FIG. 1 to allow an open mouth at the front of catcher bag 30 to fit to the rear exit from the deck cavity. Refuse propelled through the rear exit enters bag 30 through the bag's open mouth and is collected and contained in the bag's interior as mower 20 moves across underlying ground being tended. When frame 32 is removed from the mower, door 33 swings shut to block the rear exit so that any further use of the mower with the door shut returns cut debris the ground.

Unlike perforated fabric catcher bags which are original equipment on O.E.M. mowers, catcher bag 30 is a biodegradable paper bag which is intended to replace an O.E.M. fabric bag on an O.E.M. wire frame 32. Unlike an O.E.M. fabric bag which, after being emptied of refuse, is re-used, catcher bag 30 is intended for one-time use. After mower 20 has been used and refuse collected in bag 30, frame 32, with bag 30 on it, is removed from the mower and then bag 30 is removed from the frame. Bag 30 is then disposed of, along with its collected refuse, in any appropriate way, making it unnecessary to empty the collected refuse into a conventional paper lawn bag which is then disposed of. A new catcher bag 30 is then mounted on frame 32, and frame 32 is then re-mounted on mower 20.

Constructional details of bag 30 can be seen in FIGS. 2-7. Bag 30 comprises a rear end wall 34 at a rear of the bag and a multi-sided side wall 36 extending lengthwise away from rear end wall 34 toward a front of the bag. The two walls 34, 36 cooperate to form a walled enclosure 38 having an interior 39 for containing collected ground refuse which has entered the interior through an open mouth 40 at the front of the bag lengthwise opposite rear end wall 34. As manufactured, multi-sided side wall 36 contains cuts (72 in FIGS. 3, 4, and 7) which extend lengthwise toward rear end wall 34 to create foldable flaps 42 which collectively surround open mouth 40. A user of a bag may choose to lengthen some or all of the cuts for a better fit to a particular frame. However, a bag may instead be manufactured without the cuts which then are made by a user of the bag to create the flaps.

Rear end wall 34 and open mouth 40 have similar rectangular shapes with widths that are greater than their heights. The transverse cross sectional shape of side wall 36 is also rectangular, endowing multi-sided side wall 36 with four individual side walls, namely a top side wall 44, a bottom side wall 46, and transversely opposite vertical side walls 48, 50. Each flap 42 is an extension of a respective one of the four individual side walls and has a width corresponding to that of the respective individual side wall.

Wire frame 32 is sturdy enough to support bag 30 when filled with compacted refuse which has been collected within interior 39. Bag 30 is mounted on the wire frame of an O.E.M. mower, as will be more fully explained later, thereby avoiding replacement of the O.E.M. frame in order to use bag 30. All that a person need do is to remove the original fabric bag from the original frame and replace the original fabric bag with a biodegradable paper bag 30.

Figure 8:
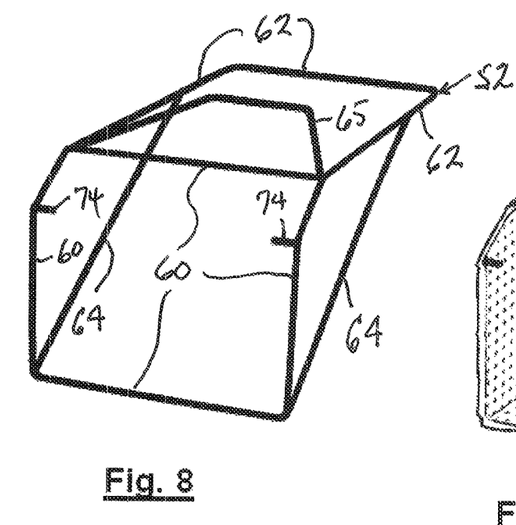
FIG. 8 is a perspective view of another wire frame which is similar in certain respects to the wire frame of FIGS. 2 and 3.
Figure 9:
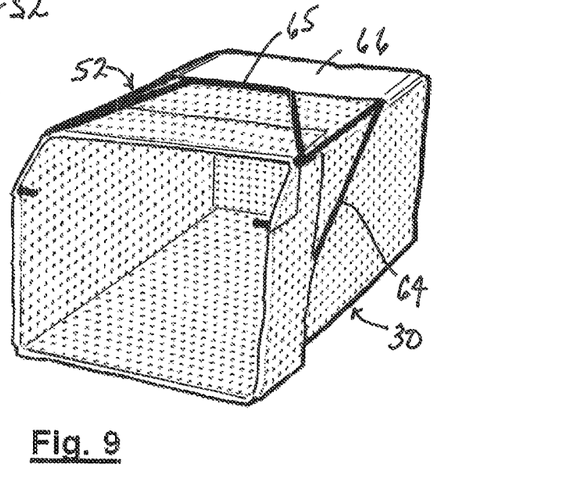
FIG. 9 is a perspective view showing a biodegradable refuse catcher bag mounted on the frame of FIG. 8.
Figures 10, 11:
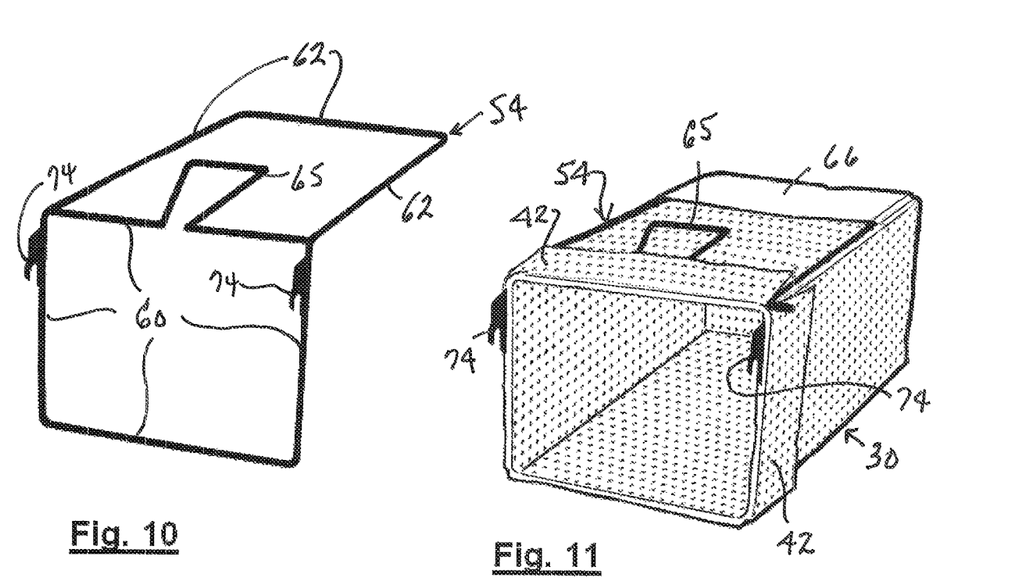
FIGS. 10 and 11 are views similar to FIGS. 8 and 9 showing a biodegradable refuse catcher bag mounted on the frame of a different lawn mower.
Figure 12:
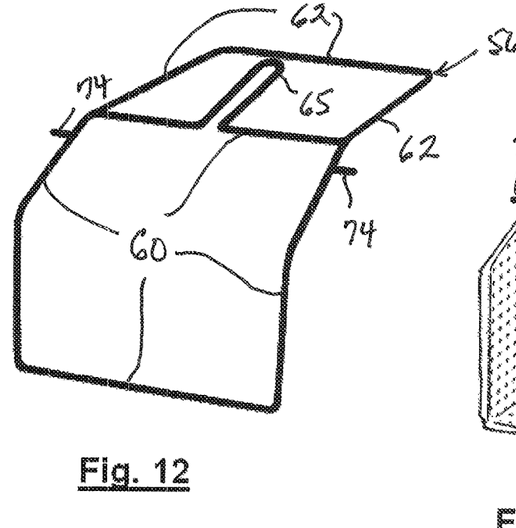
FIGS. 12 and 13 are views similar to FIGS. 8 and 9 showing a biodegradable refuse catcher bag mounted on the frame of another different lawn mower.
Figures 14, 15:
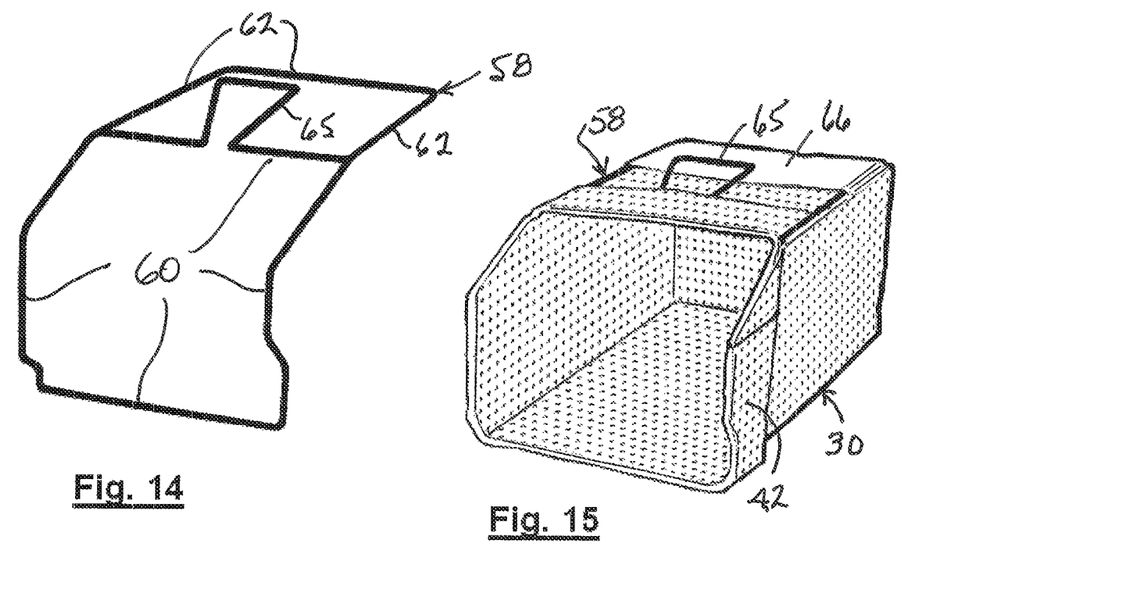
FIGS. 14 and 15 are views similar to FIGS. 8 and 9 showing a biodegradable refuse catcher bag mounted on the frame of still another different lawn mower.
Figure 16:
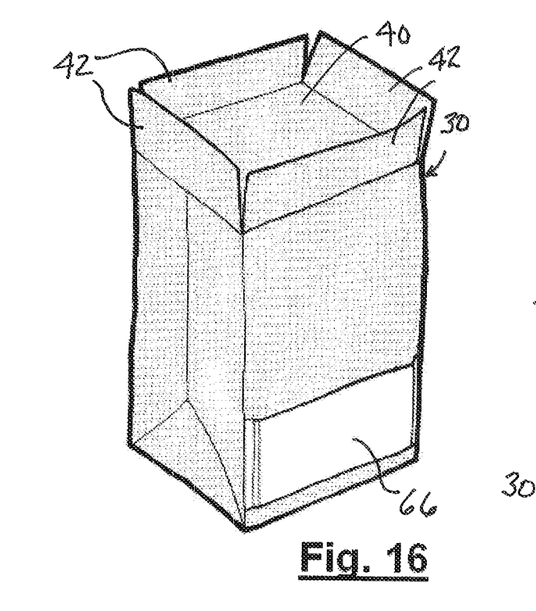
FIGS. 16-19 are a sequence of perspective views showing a method of mounting a biodegradable refuse catcher bag on a frame.
Figure 17:
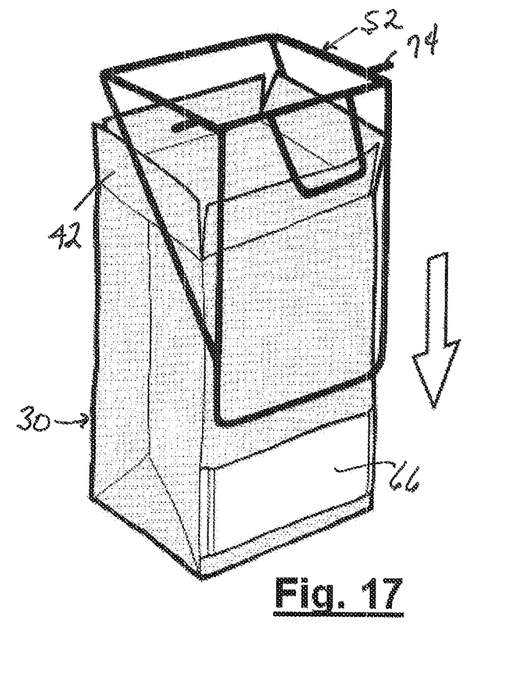

Only portions of wire frame 32 are visible in FIG. 1 and so reference is made to FIG. 8 for a complete description of a frame 52 which is quite similar to frame 32. Several additional models of O.E.M. frames 54, 56, and 58 are shown in FIGS. 10, 12, and 14. All frames share the commonality of a four-sided wire front, or first, frame section 60 for supporting open mouth 40 of a bag 30 and a three-sided wire rear, or second, frame section 62 for supporting the rear of a bag 30 near rear end wall 34. Rear frame section 62 can be seen in FIG. 1, but front frame section 60 cannot. Both frame 32 and frame 52 have wire struts 64 on each side extending between the two frame sections 60, 62 to prevent rear frame section 62 from bending on front frame section 60. All frames have a handle 65.

For supporting the rear of bag 30 on frame 32 near rear end wall 34, bag 30 comprises a biodegradable paper strap 66, having a length which extends transversely of the length of bag 30 and a width which extends lengthwise of bag 30. As indicated by reference numerals 68 and 70 (FIG. 4), opposite lengthwise ends of strap 66 are attached to bag 30 in any suitable manner, such as by a strong adhesive, leaving a majority of the strap's length and width between its points of attachment to bag 30 unattached to top side wall section 44 and thereby providing space into and through which rear frame section 62 can be slid as suggested by FIGS. 2 and 3. Strap 66 has sufficient strength for supporting the rear of bag 30 from frame 32 when the bag and its contents are fully loaded with compacted refuse.

Figure 2:
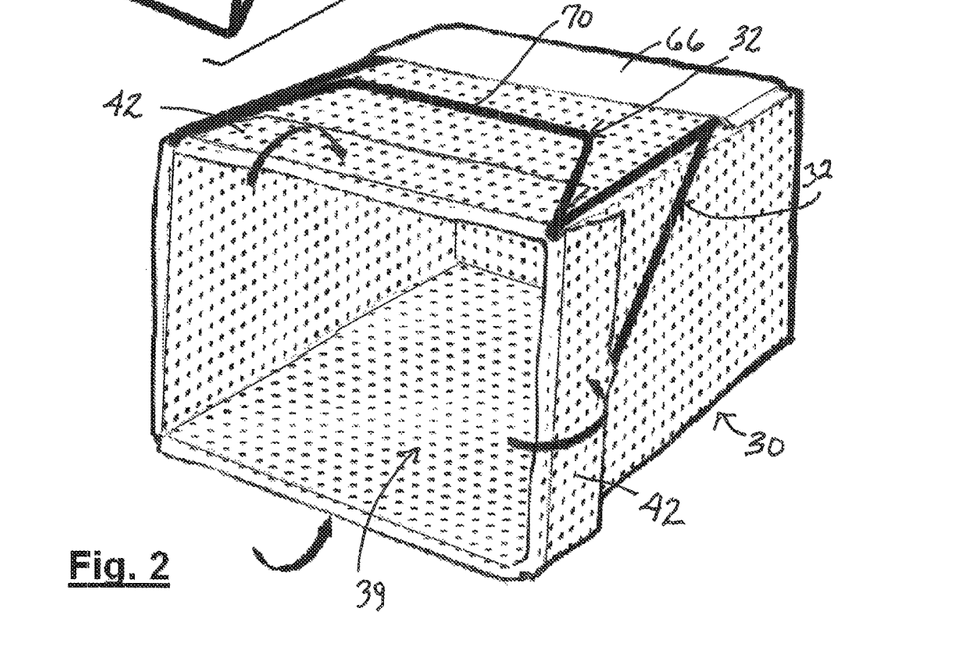
FIG. 2 is a perspective view of the bag and a wire frame on which the bag is mounted as viewed from the left front after the wire frame has been removed from the lawn mower.
Figure 3:
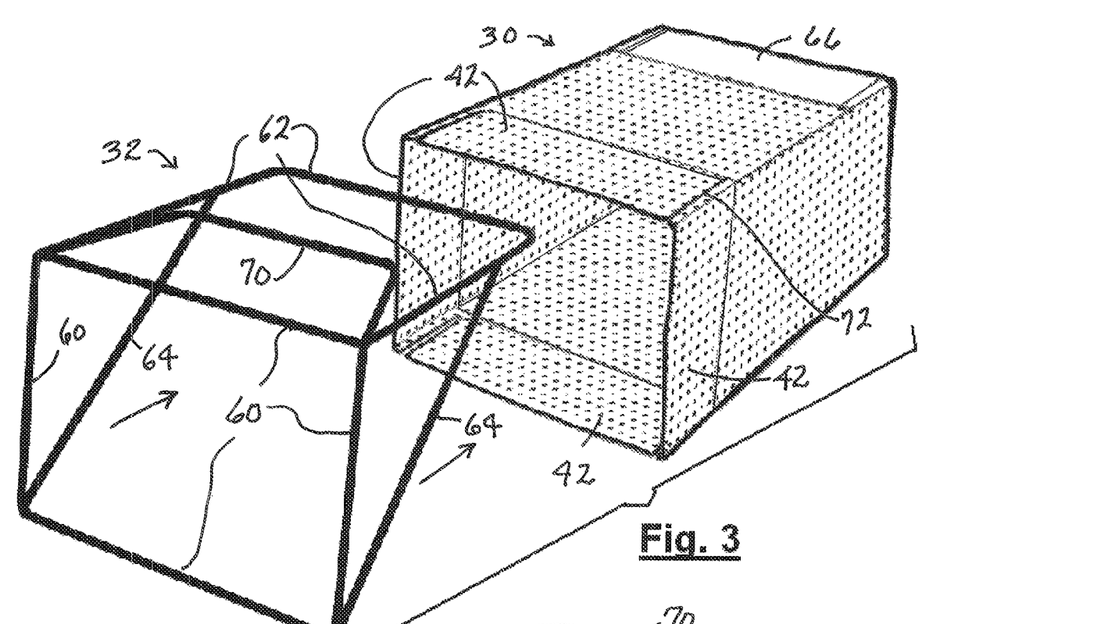
FIG. 3 is a perspective view similar to FIG. 2 showing the bag and frame prior to mounting the bag on the frame.
Figure 4:
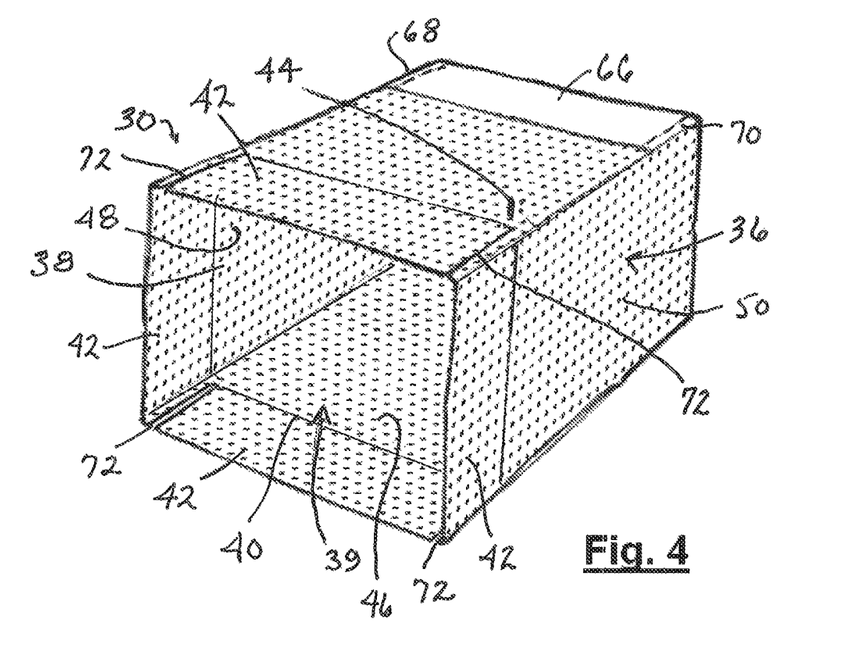
FIG. 4 is an enlarged perspective view from the left front of the bag by itself.
Figure 5:
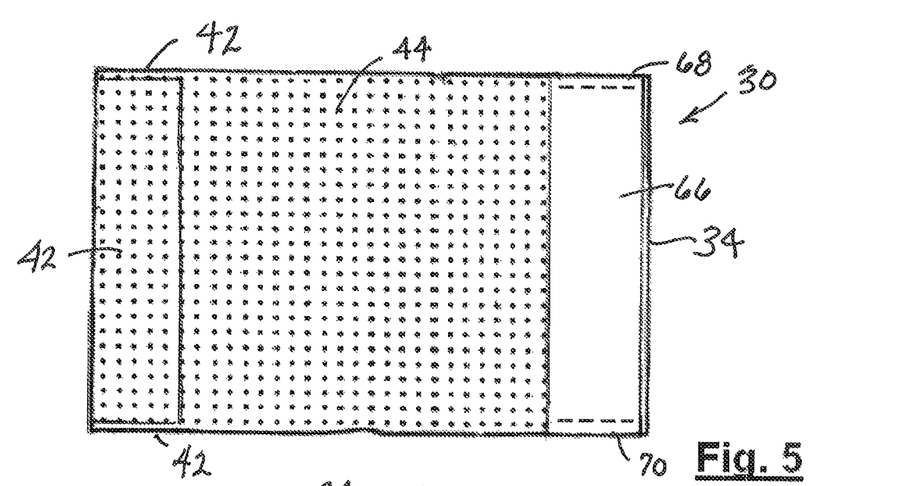
FIG. 5 is a top plan view of the bag.
Figure 6:
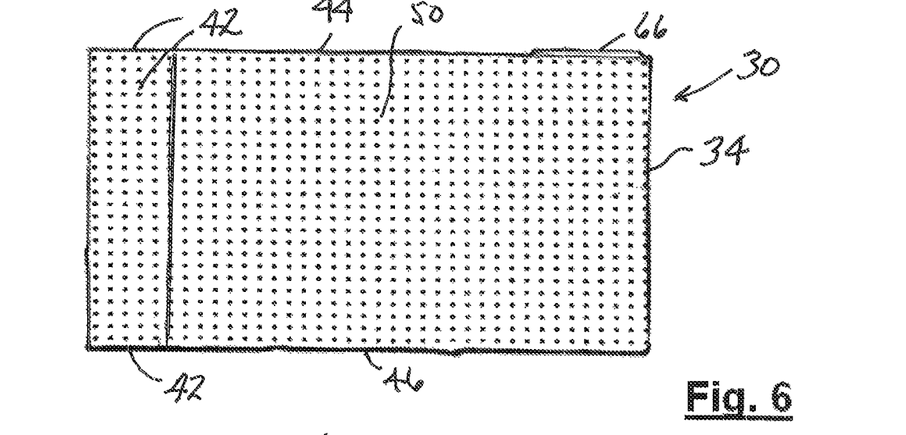
FIG. 6 is left side elevation view of the bag.

The front of bag 30 at open mouth 40 is mounted on front frame section 60 as shown in FIGS. 1 and 2 by reverse folding each flap 42 over a respective wire of front frame section 60 along a fold line which is transverse to the bag's length so that each flap captures each wire between itself and a lengthwise adjacent area of the respective individual side wall 44, 46, 48, and 50. The flexibility of the bag paper allows the flaps to be kept folded by crimping around the frame.

Figure 7:
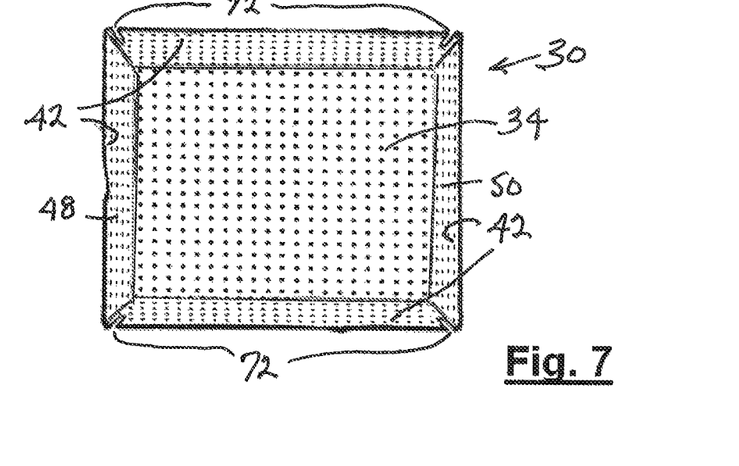
FIG. 7 is a front elevation view of the bag.

The extent to which a folded flap overlaps the lengthwise adjacent area of the respective individual side wall is selectable. When bag 30 is being mounted on front frame section 60, a cut 72 at each of the four corners at open mouth 40 where an individual side wall joins two adjacent individual side walls, as shown in FIG. 7, can, if not already cut long enough to create adequate flap length, be cut, or torn by hand, further along the length of the bag to set the extent of flap overlap with an adjacent area of the side wall section when a flap is folded back over a wire of frame 32. Tearing by hand at, or closely adjacent, each corner is facilitated by perforations 74 in the bag at, or close to, each corner, and that can make use of a cutting tool unnecessary.

Rear end wall 34 and individual side walls 44, 46, 48, and 50 contain a multitude of through-holes (i.e. perforations 74), sized to allow air to pass from interior 39 out of enclosure 38 while limiting size of collected refuse allowed to pass from interior 39 out of enclosure 38 as air-entrained refuse is being propelled into the bag. The through-holes are shown in a multi-column, multi-row arrangement of perforations having any suitable shape such as circular for example.

Figure 13:
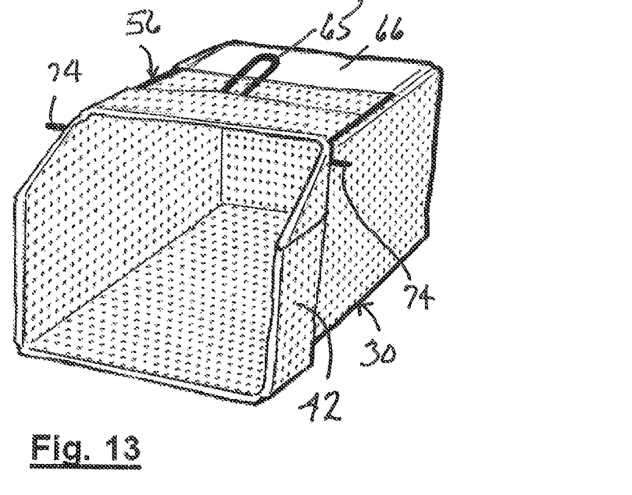
Figure 19:
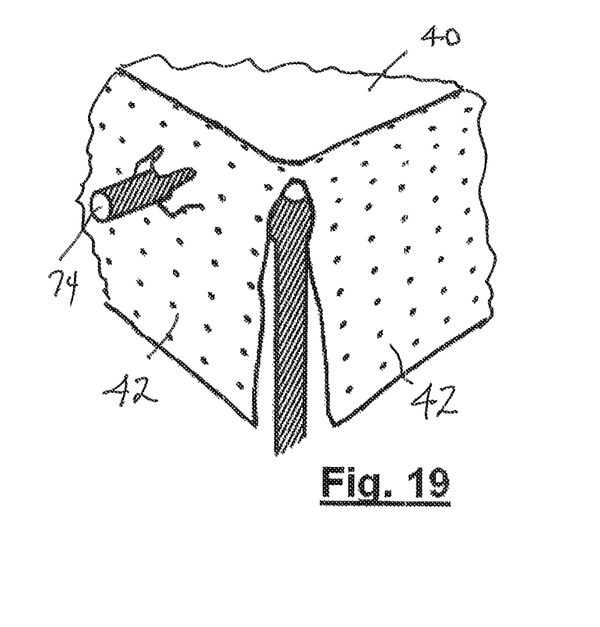

When a bag 30 is to be mounted on frame 32, FIG. 2 shows the frame positioned in front of open mouth 40 and aligned with bag 30 such that when frame 32 is advanced toward bag 30 (or bag 30 is advanced toward frame 32), the entire frame fits over the exterior of the bag. However, certain features of other frames which are used in locating the frame on the mower deck at the rear exit from the deck may locally pierce the bag paper as shown in FIGS. 11, 13, and 19.

Relative advancement of frame 32 and bag 30 toward each other results in rear frame section 62 having been slid into and through the space between strap 66 and top side wall section 44 and in the four wires of frame section 60 overlying side wall sections 44, 46, 48, and 50 at some distance rearward of open mouth 40. Flaps 42 can then be folded back over the four wires of frame section 60, as suggested by FIG. 2, to capture each wire between a respective flap and a lengthwise adjacent section of the respective side wall section 44, 46, 48, and 50. The flexibility of the paper allows the flaps to be secured by crimping them onto the wires of front frame section 60, and then, as will be explained below, features 74 such as mounting pins or mounting brackets can be pushed through the paper at appropriate locations to complete the bag mounting as shown in FIG. 2. The frame/bag assembly is then ready to be mounted on deck 22 to place mouth 40 over the rear exit from the deck.

To mount the frame/bag assembly, a person grasps a handle 65 of frame 32, and after swinging door 33 out of the way, mounts the frame on the deck with mouth 40 fitting over the rear exit from the deck. The mower is then ready for use.

After mower 20 has tended ground and a bag 30 has been filled, either completely or partially, with collected refuse, frame 32 can be removed from the mower and the bag then removed from the frame for disposal, after which a new bag is mounted on the frame, and the frame is re-mounted on the mower.

Figure 18:
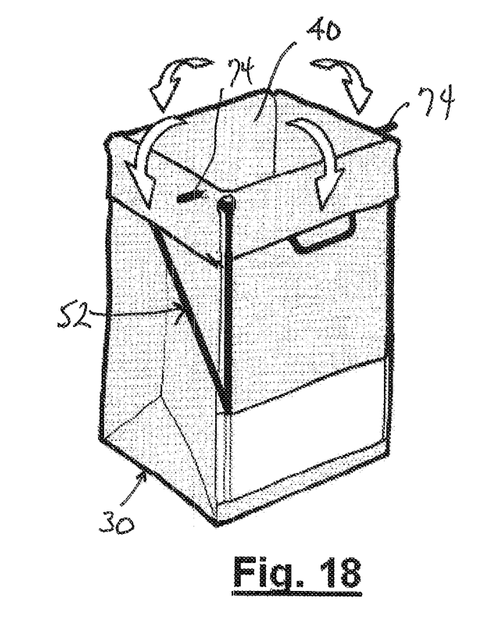

FIGS. 16-19 illustrate a convenient way to mount a bag 30 on a frame, specifically frame 52 in these FIGS. Bag 30, which as manufactured is folded flat, is opened and stood upright on the ground with rear end wall 32 resting on the ground. Frame 52 is positioned over the open mouth 40 and advanced toward the bag in the same manner as explained above with reference to FIGS. 2 and 3. Frame section 62 is slid into and through the space between strap 66 and top side wall section 44 with the four wires of frame section 60 overlying side wall sections 44, 46, 48, and 50 at some distance rearward of open mouth 40. Flaps 42 are folded over the four wires of front frame section 60, as suggested by FIG. 18, to capture each wire between a respective flap and a lengthwise adjacent section of the respective side wall 44, 46, 48, and 50, and they are then secured by crimping them around the wires to complete the bag mounting as shown in FIG. 18. The frame/bag assembly is then ready to be mounted on deck 22 to place mouth 40 over the rear exit from the deck so that refuse propelled out of the deck through the rear exit will enter bag 30. Frames 52 and 56 have mounting pins 74, and frame 54 has mounting hooks 74, which are used to locate the open mouth 40 of the bag to the rear exit from the deck. These features can be easily pushed through the paper of a flap or the paper of an individual side wall and an overlying flap to expose the features so that they can be seen by a person when mounting the frame and bag on the mower.

What is claimed is:

1. An assembly of an O.E.M. catcher bag frame which can be removably mounted on a ground tending machine and a catcher bag mounted on the frame for collecting ground refuse which is propelled into the catcher bag when the catcher bag is mounted on a ground tending machine, the catcher bag comprising a walled enclosure constructed of foldable biodegradable paper and having a rear end wall at a rear of the catcher bag and a multi-sided side wall extending along a length of the catcher bag away from the rear end wall to a multi-sided open mouth at a front of the catcher bag, the enclosure having an interior for containing collected ground refuse which enters the interior through the open mouth, the biodegradable paper containing a multitude of perforations sized to allow air to pass from the interior out of the enclosure while limiting size of collected refuse allowed to pass from the interior out of the enclosure, the frame comprising a multi-sided front frame section which supports the multi-sided open mouth of the catcher bag and a rear frame section which supports the rear of the catcher bag, and in which the catcher bag comprises a part, disposed on an exterior of the enclosure rearward of the open mouth and fastened to the enclosure, via which the rear frame section supports the rear of the catcher bag, in which the rear end wall and the open mouth have similar rectangular shapes, the multi-sided side wall has a transverse cross sectional shape which is also rectangular thereby endowing the multi-sided side wall with a top side wall, a bottom side wall, and transversely opposite vertical side walls, each of which has a width which is transverse to the bag's length, and each flap joins with a respective side wall of the multi-sided side wall, in which the part, disposed on an exterior of the enclosure rearward of the open mouth and fastened to the enclosure, comprises a biodegradable paper strap overlying the top wall of the multi-sided side wall and having a length transverse to the length of the catcher bag, lengthwise opposite ends of the strap are attached to the enclosure to leave a portion of the length and width of the strap between the strap's attachment to the enclosure unattached to the top wall of the multi-sided side wall.

2. An assembly as set forth in claim 1 which the multi-sided front frame section comprises multiple wire elements and the foldable paper of the catcher bag comprises multiple flaps which surround the open mouth and each of which is reverse-folded over a respective wire element.

3. An assembly as set forth in claim 1 which the rear end wall contains some perforations and the multi-sided side wall also contains some perforations.

\* \* \* \* \*